Figure 4:
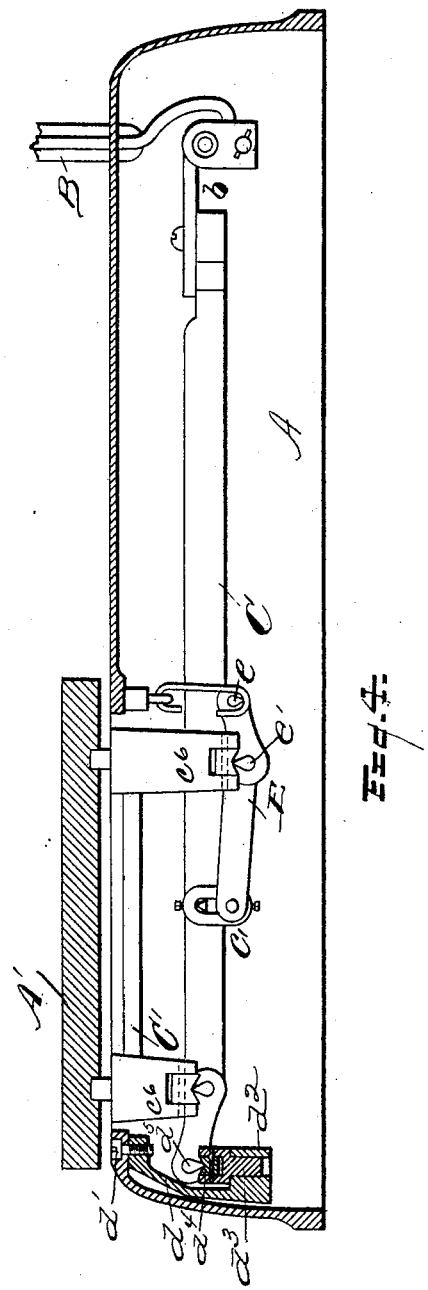

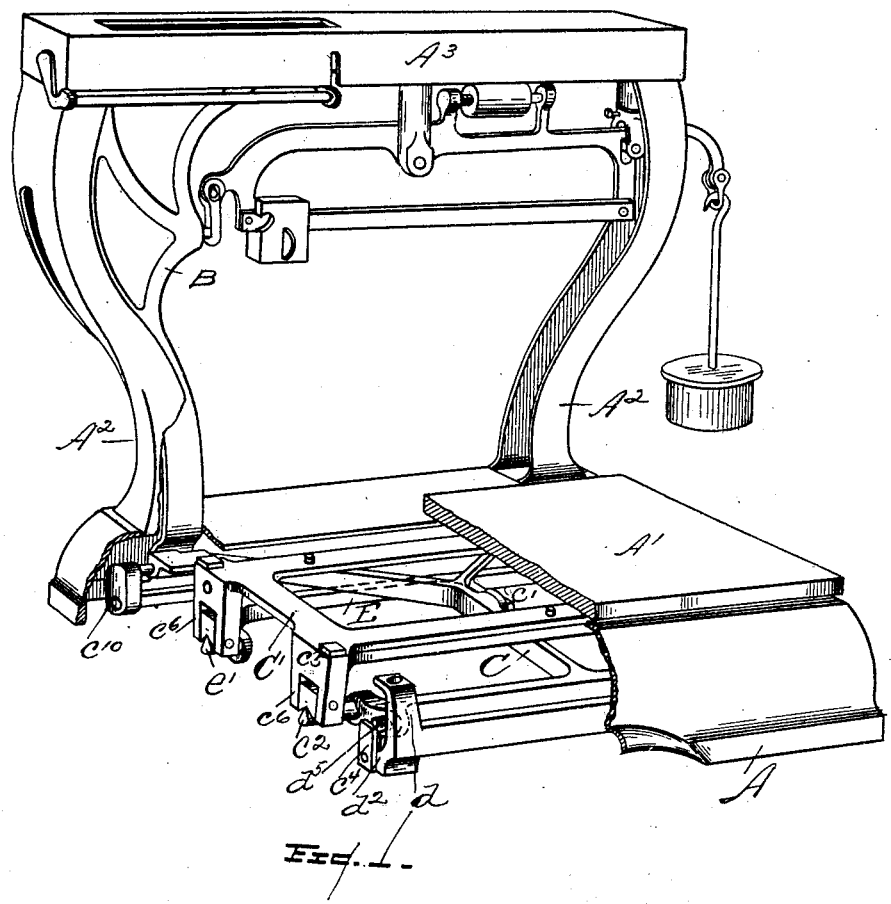

No. 710,003. Patented Sept. 30, 1902.
F. C. OSBORN.
PLATFORM SUPPORT FOR SCALES.
(Application filed Dec. 17, 1900.)
(No Model.) 5 Sheets—Sheet 2.
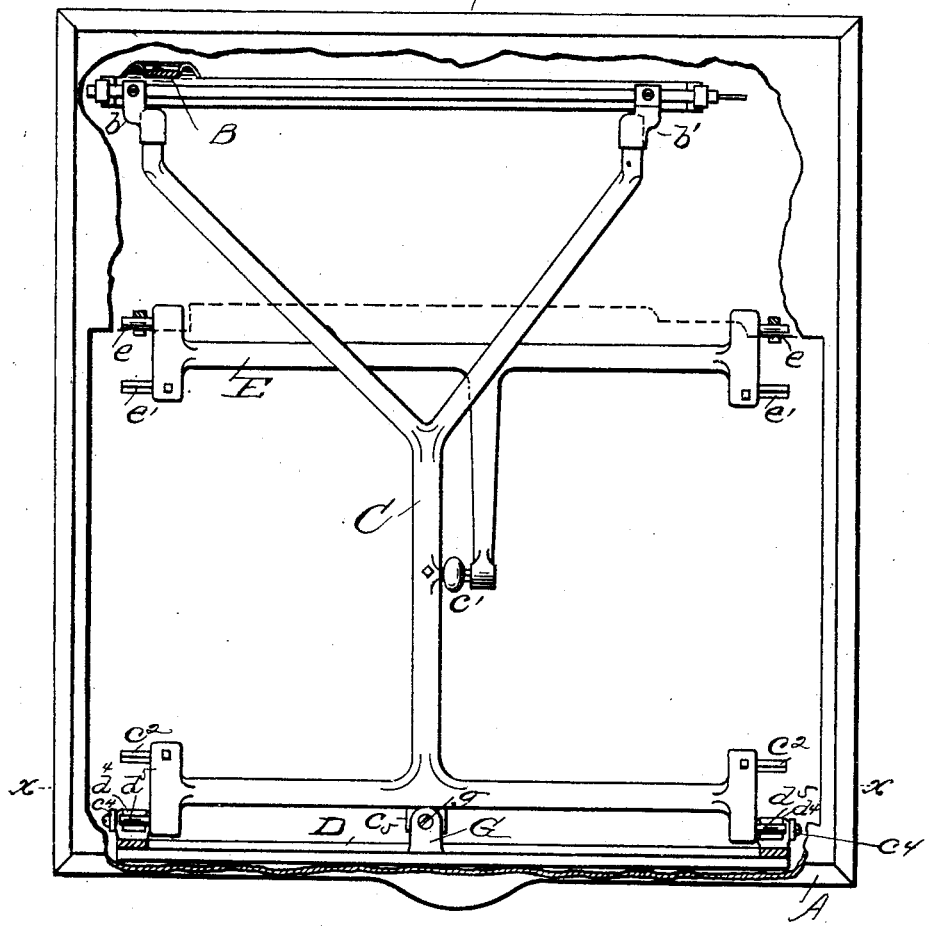
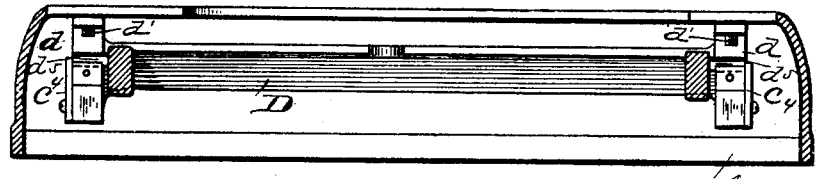
WITNESSES
Frank Drury
Nat Marcy
INVENTOR
Francis C. Osborn
By Fisk & Thomas
Attorneys No. 710,003. Patented Sept. 30, 1902.
F. C. OSBORN.
PLATFORM SUPPORT FOR SCALES.
(Application filed Dec. 17, 1900.)

(No Model.) 5 Sheets—Sheet 3.

WITNESSES
Frank Linve
Nat Massey

INVENTOR
Francis C. Osborn
By Fisk & Thomas
Attorneys

No. 710,003. Patented Sept. 30, 1902.
F. C. OSBORN.
PLATFORM SUPPORT FOR SCALES.
(Application filed Dec. 17, 1900.)
(No Model.) 5 Sheets—Sheet 4.
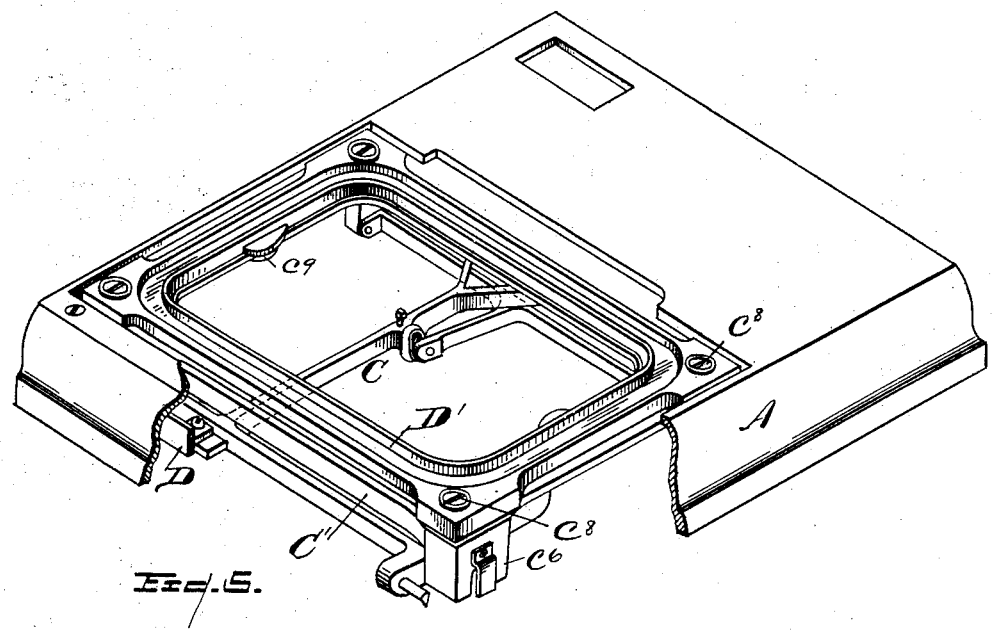
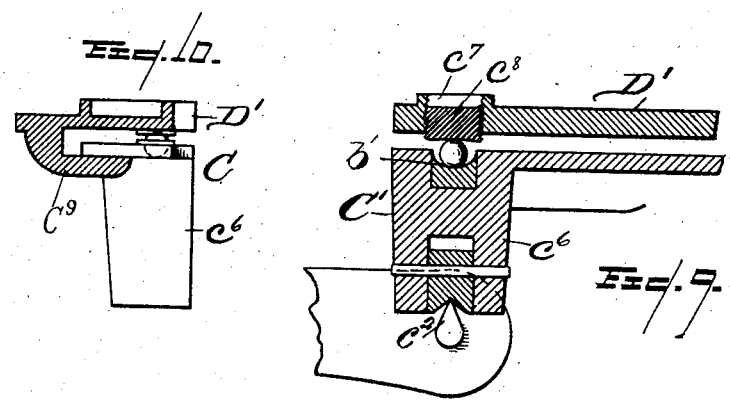
WITNESSES
INVENTOR
Francis C Osborn
By Fish & Thomas
Attorneys

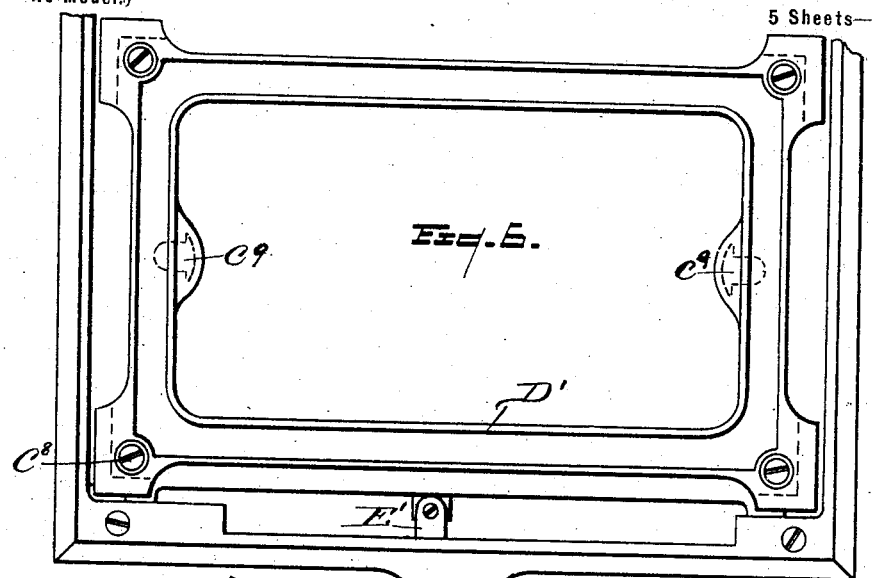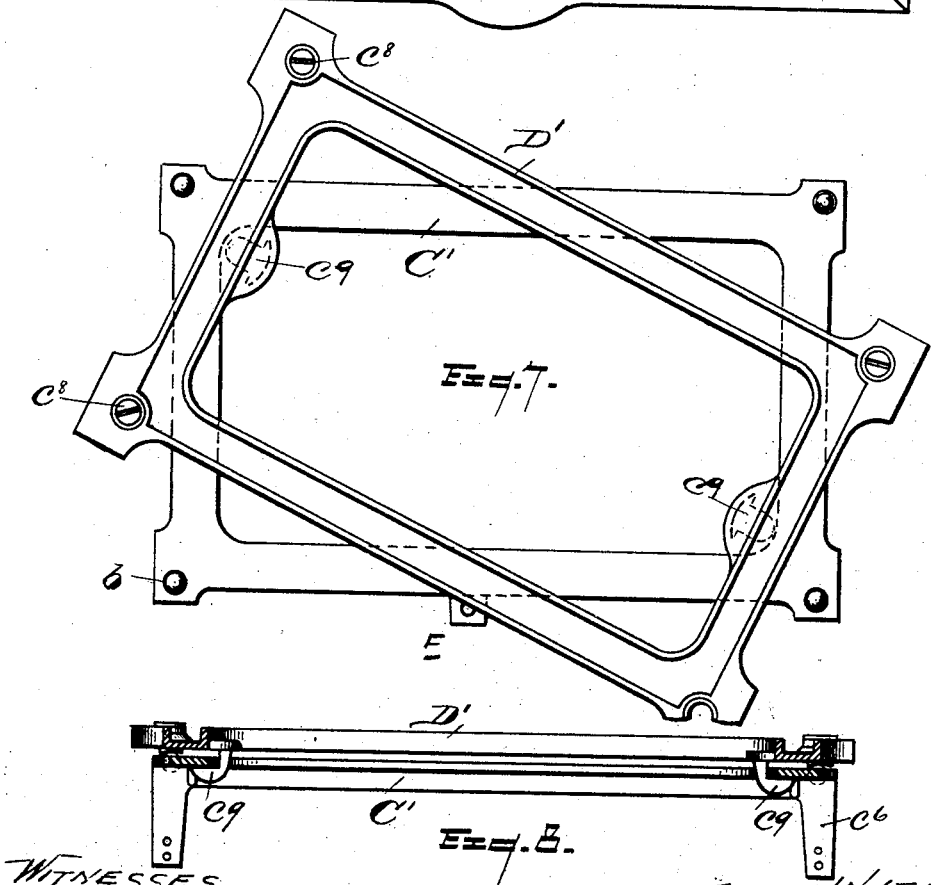

UNITED STATES PATENT OFFICE.

FRANCIS C. OSBORN, OF DETROIT, MICHIGAN.

PLATFORM-SUPPORT FOR SCALES.

SPECIFICATION forming part of Letters Patent No. 710,003, dated September 30, 1902.

Application filed December 17, 1900. Serial No. 40,180. (No model.)

*To all whom it may concern:*

Be it known that I, FRANCIS C. OSBORN, a citizen of the United States, residing at Detroit, county of Wayne, State of Michigan, have invented a certain new and useful Improvement in Platform-Supports for Scales; and I do declare the following to be a full, clear, and exact description of the invention, such as will enable others skilled in the art to which it pertains to make and use the same, reference being had to the accompanying drawings, which form a part of this specification.

My invention relates to improvements in platform-scales; and its object is to provide means for limiting the swinging movement of the platform-levers and for preventing the wear on the pivots.

It is shown in the accompanying drawings, in which—

Figure 1 is a perspective view with parts of the base and platform removed. Fig. 2 is a plan view of the platform-levers. Fig. 3 is a vertical sectional view on line $x\,x$ of Fig. 2. Fig. 4 is a longitudinal vertical sectional view of the base, platform, and platform-levers. Fig. 5 is a perspective view of the base of a scale with the platform removed and the corner of the base cut away. Fig. 6 is a plan view of a part of the base with the platform removed. Fig. 7 is a view showing the subbase and the platform-base, illustrating the means for assembling the two. Fig. 8 is a longitudinal sectional view of the parts shown in Fig. 3. Fig. 9 is a detail of the ball-bearing support, and Fig. 10 is a detail showing the means for holding the subbase and the platform-base together.

In the drawings, A represents the base, A' the platform, $A^2$ the standards, and $A^3$ the upper frame, of the scale. B represents a standing frame, constituting the connecting means between the platform-levers and the beam. (Not shown.) The purpose of this frame is fully explained in my application for patent, Serial No. 703,412.

C represents the main platform-lever, which in the form of scale shown herein is connected to the standing frame B at two points $b$ and $b'$. My invention consists in part in providing for this lever C at its forward end fixed knife-edge pivots in place of the swinging links heretofore employed for this support. The details of this support are as follows: D represents a transverse bar provided at each end with an upward extension $d$, with a screw-hole tapped to receive the screw $d'$, that is countersunk in the base from above and by which the bar D is held firmly in place within the base. $d^2$ represents an extension standing out forward of the bar D at each end and is provided with a vertical hole in which the block $d^3$ is swiveled on shoulders resting on top of the extension. In the upper end of the block $d^3$ is swiveled the steel knife-edge bearing $d^4$, the construction being such that the bearing $d^4$ will adjust itself parallel with the edge of the knife-edge $d^5$ in two directions by the rocking of the bearing and by the turning of the block $d^3$ on its axis.

With the exceptions above described the platform-levers shown herein are the same as heretofore used by me.

E represents the second lever, having swinging knife-edge pivots at $e$ and a link connection with the main lever C at $c'$.

$c^2\,c^2$ represent knife-edge supports for the platform-base F on the lever C, and $e'\,e'$ similar supports on the lever E.

As the lever C is held by its forward supports against swinging or endwise movement, the platform-base F is likewise held against such movement by having a fixed support thereon. Thus the scale as finally assembled supports the platform in a fixed position, and the displacement of the several bearings through the swinging of the levers is prevented. In practice I find a scale constructed as described extremely quick, accurate, and sensitive.

While the fixed bearing described is of value in any form of platform-scale, it is of especial value in the connection in which I use it in combination with the standing frame B.

By my construction the swinging of the frame B backward and forward is prevented and all objections to its use removed.

To prevent the lever C from moving sidewise, I use the small vertical plates $c^4\,c^4$, screwed to the ends of the bar D, and similar plates are used over ends of pivots $c^2$ and $e'$ to prevent platform-frame from shifting.

In Figs. 5 to 10 I show details of construction of a floating platform and platform-support which I use in connection with the fixed pivots before described. In these figures, C' represents the subbase resting on the platform-lever, and D' represents the platform-base supported on the subbase C'. The manner of supporting the subbase C' from the platform-lever is the same as that commonly used in scales of this class and shown in Fig. 1, the subbase being provided with four legs $c^6$, each resting on a knife-edge attached to the platform-levers. In the ordinary scale the subbase has a slight floating movement; but in my invention the subbase remains fixed against horizontal movement by reason of its support on the lever having the fixed bearing.

By giving to the platform itself a slight vibratory movement side strain and wear on the pivots of the levers are avoided. To provide for this slight vibratory movement, I set in each corner of the subbase a steel block $b'$, having a concave upper surface, and through the corners of the platform-base I drill and tap a hole $c^7$, in which I set a round screw-threaded block $c^8$, having a cut across the upper end to provide for turning it with a screw-driver. The lower end of the block $c^8$ I form slightly concave. In the block $b'$ I place a steel ball, one at each corner, and rest the platform-base on these balls. This means of supporting the platform allows it a floating movement within the limits of the space allowed for it in the base, and the limitation to the movement of the platform is such as to prevent its moving the subbase.

To provide for holding the subbase and the platform-base together, I provide the platform-base with a hook $c^9$ at each end. This hook extends downward a sufficient distance to come under the subbase, and the hooks are such a distance apart as to allow the bases to be assembled only when they are in the position shown in Fig. 7. By swinging the platform-base from the position shown in Fig. 7 to that shown in Fig. 6 the hooks come under the subbase and hold the two bases together.

In the drawings, E' represents a lug extending inward from the base to meet a similar lug extending outward from the subbase, the two lugs being connected by a screw. The relative position of the two lugs as to elevation is such that when the screw is run into its limit it lifts the subbase a sufficient distance to raise it off from the knife-edged bearings or pivots below. While I show one pair of these lugs in Fig. 7, a similar pair is located on the opposite side, and, if desired, a pair may be located at each end. The object of these lugs and screws is to prepare the scale for shipment, so as to avoid injury to the pivots in shipping.

What I claim is—

1. In scale construction, the combination of the base provided with fixed bearings, the frame B and the main platform-lever having one end pivoted directly on the fixed pivot-bearings on the base at two points and the other end pivoted directly to the frame B at two points, whereby the lever and frame are held against horizontal movement of translation, substantially as described.

2. The combination of the base, the subbase, pivots on which the subbase rests, lugs on the base and subbase, and means for drawing the lugs together to lift the subbase off from the pivots, substantially as described.

In testimony whereof I sign this specification in the presence of two witnesses.

FRANCIS C. OSBORN.

Witnesses:
S. E. THOMAS,
C. H. FISK.